United States Patent [19]

Kerpez

[11] Patent Number: 5,295,159
[45] Date of Patent: Mar. 15, 1994

[54] COORDINATED CODING FOR DIGITAL TRANSMISSION
[75] Inventor: Kenneth J. Kerpez, Pottersville, N.J.
[73] Assignee: Bell Communications Research, Inc., Livingston, N.J.
[21] Appl. No.: 870,579
[22] Filed: Apr. 17, 1992
[51] Int. Cl.$^5$ .................. H04K 1/10; H04L 27/28; H04L 1/02; H04B 7/02
[52] U.S. Cl. ........................... 375/38; 375/40; 375/99; 375/102; 371/68.1
[58] Field of Search .............. 375/37, 38, 99, 101, 375/102, 103, 40, 14; 371/67.1, 68.1, 68.2, 37.8, 41, 57.1

[56] References Cited
U.S. PATENT DOCUMENTS
4,821,289  4/1989  Peile .................................... 375/102
5,181,198  1/1993  Lechleider ........................... 375/102

OTHER PUBLICATIONS

Kastoria et al., "Vector Coding With Decision Feedback Equalization For Partial Response Channels", 1988, Globelom 1988, pp. 853–857.
Forney, Jr. et al. "Multidimensional Constellations—Part I: Introduction, Figures of Merit, and Generalized Cross Constellations", Aug. 1989, IEEE Journal on Sel. Areas in Communications, vol. 7, No. 6, pp. 877–892.
"Coordinated Transmission for Two-Pair Digital Subscriber Lines", J. W. Lechleider, IEEE, vol. 9, No. 6, Aug. 1991, pp. 920–930.
"Study of the Feasibility and Advisability of Digital Subscriber Lines Operating at Rates substantially in excess of the Basic Access Rate", Bellcore, J. W. Lechleider, T1E1.4, Dec. 11, 1989, "Averaging of the Signal to Noise Ratios of the Constituent Pairs of a Two-pair DSL".
"Simple Reception Techniques for Coordinated Two-Pair Digital Transmission", D. D. Falconer and E. Arnon, IEEE Global Telecommunications Conference, Phoenix, Ariz., Dec. 2–5, 1991, vol. 1 of 3.

Primary Examiner—Stephen Chin
Assistant Examiner—Duane Kobayashi
Attorney, Agent, or Firm—Leonard C. Suchyta; Loria B. Yeadon

[57] ABSTRACT

Methodology, and associated circuitry, for encoding and decoding an incoming data stream utilize a coordinated code constellation that effects robust signal detection in the presence of channel interference. The encoder partitions the incoming data stream into contiguous data segments in proportion to the number of levels for a given coordinated code. Each data segment is mapped with reference to the coordinated code to signal levels suitable for transmission over a plurality of channels. The decoder measures the received signals on the channels and estimates noise statistics for the channels. A metric relationship engendered by the coordinated code is evaluated with reference to the received signals, estimates to the received signals, and the noise statistics. An output data stream is then generated based on the evaluation of the metric.

21 Claims, 9 Drawing Sheets

COORDINATED CODING FOR DIGITAL TRANSMISSION

FIELD OF THE INVENTION

This invention relates generally to digital systems and, more specifically, to the transmission of digital information over coordinated transmission paths, and to concomitant techniques for encoding and decoding the digital information.

BACKGROUND OF THE INVENTION

New telecommunications services recently introduced and presently being planned require that high-speed terminating equipment be interconnected to telecommunications service points using high capacity digital facilities. Accordingly, there is currently special interest in high rate digital subscriber lines (HDSL) to carry 1.544 Mbit/sec bidirectional data over local copper telephone loops. As originally proposed, HDSL utilized two twisted wire pairs for transmission of the 1.544 Mbit/sec over the required distance range with an acceptable error rate. The basic communication environment of HDSL then is one wherein there are two channels available for transmission and each channel has additive noise with different power. Moreover, the transmitter has no knowledge of the power of the noise on each channel. Also, the noise powers are constant or vary slowly so that the receiver may estimate the noise statistics.

The initial implementation of HDSL utilized so-called "uncoordinated" transmission to meet the acceptable error rate criterion, but oftentimes only marginally. With uncoordinated transmission, the total message represented by a data stream is divided and each channel independently carries a part of the stream. Uncoordinated transmission has good performance when each channel has about the same noise power, but if just one channel is very noisy then the message is lost. Another technique deployed to overcome limitations of uncoordinated transmission is called "symbol splitting" diversity. With symbol splitting diversity, a copy of the entire message is transmitted on each channel so that the message may still be fully recovered if one channel is very noisy. However, symbol splitting has relatively poor throughput performance if each channel has nearly the same noise power.

Recently, in a paper entitled "Coordinated Transmission for Two-Pair Digital Subscriber Lines, " *IEEE Journal on Selected Areas in Communications, Special Issue on High-Speed Digital Subscriber Lines*, Vol. 9, pp. 920–930, August, 1991, J. W. Lechleider proposed an improvement to the performance of HDSL by coordinating the transmission on the two lines. In order to achieve the required improvement in the signal-to-noise ratio as well as other enhancements and benefits, the coordinated transmission technique relates loop signal amplitudes transmitted on the two lines to each other and processes the received signals according to the prescribed relation between the amplitudes. The system for coordinated transmission includes both a central office transceiver and a remote transceiver terminating the corresponding ends of the pair of lines. Each transceiver includes a near-end transmitter and a receiver for a far-end transmitter. The near-end transmitter distributes first and second data signals originated by first and second data sources, respectively, over the pair of transmission lines. The lines are coupled to this transmitter by first and second hybrid arrangements which each have transmit and receive ports. The receive ports of the hybrid arrangements provide first and second received line signals, respectively, each having echo and NEXT (Near-End Crosstalk) interfering components. Each transmitter in the coordinated transmission system is adaptive and requires knowledge of the noise on the transmission lines. The statistics are formed at the far-end receiver and are fed back to the near-end transmitter so that the amplitudes and power of the transmitted data signals on the first line are typically different than the amplitudes and power on the second line.

Another method of implementing coordinated transmission using an adaptive transmitter was also considered by Lechleider in "Averaging of the Signal to Noise Ratios of the Constituent Pairs of a Two-pair HDSL," ECSA Contribution, T1E1.4.89, Dec. 11, 1989. In this Contribution, Lechleider's adaptive matrix transmitter essentially whitens the noise, and leads to the optimal "water-filling" power allocation. D. D. Falconer, in his article "Simple Reception Techniques for Coordinated Two-Pair Digital Transmission," 1991 Globecom Conference, showed that significant performance gains can be achieved simply by allowing the average transmitted signal power on each channel to vary, while keeping the sum of the transmitted power on all the channels constant.

As pointed out above, the techniques taught or suggested by the prior art relating to coordinated transmission systems have only achieved the aforementioned improvements by utilizing adaptive transmitters. Adaptive transmitters have the disadvantage of requiring that knowledge of the channel response be supplied to the transmitter, and moreover, such transmitters send different average powers on different channels.

SUMMARY OF THE INVENTION

The technique in accordance with the present invention, designated "coordinated coding," has the high performance of uncoordinated transmission when the noise powers are equal, and the high performance of symbol splitting when some channels are very noisy.

Broadly, in accordance with the transmitter aspect of the present invention, an incoming data stream is partitioned into data segments in proportion to the number of levels for a given coordinated code. For instance, for a $M^L$-ary coordinated code system, the stream is partitioned into data segments of length $L\log_2 M$. If the incoming stream is to be transmitted over L outgoing channels, each data segment is mapped, via the coordinated code, to L signal levels corresponding to the L channels. The various signal components as determined by the coordinated code, are then propagated over the corresponding channels.

In accordance with the receiver aspect of the present invention, a generalized receiver measures and computes the noise statistics on each channel, as well as the noise covariance matrix across all the L channels, using both the received signal levels and estimates as to the actual signal levels propagated by the transmitter. From these noise statistics, a metric relationship engendered by the coordinated code is evaluated to produce the maximum likelihood estimate to the signal levels. The noise statistics estimation and metric evaluator may also be embedded in a decision feedback equalizer realization to produce the maximum likelihood estimates of the channel signal levels.

One advantage of the coordinated code is that the coding technique requires no bandwidth expansion and no interleaving. Yet another advantage of the coordinated coding technique is that, in addition to HDSL, the code is applicable to a variety of multi-channel and diversity systems, including digital radio and multi-tone transmission. Also, the coordinated code is not corrupted by intersymbol interference.

The organization and operation of the invention will be better understood from a consideration of the detailed description of the illustrative embodiments thereof, which follow, when taken in conjunction with the accompanying drawing.

DETAILED DESCRIPTION

In this description, so as to gain insight into the underlying principles in accordance with the present invention, a motivating overview of a simplified aspect of the present invention is initially presented. This approach has the added advantage of introducing notation which will further aid in understanding the broad aspects of the present invention. After this introduction, a theoretical basis is then presented to provide additional insight into the circuitry and concomitant methodology which are presented during discussion of the motivating overview.

Motivating Overview

The coordinated code for the two transmission line case is first presented since it is illuminating and practical.

I. Transmitter for the Two Line Case

The illustrative coordinated code in accordance with the present invention for the two line case transmits 16-level signals on each of two channels (each line is also referred to as a channel in the following description without loss of generality). The signals transmitted on one channel are a specific permutation of the signals transmitted on the second channel. There are 16 possible message pairs of codewords, designated [$m_1$, $m_2$], which form a 16-point two-dimensional constellation. Each codeword represents 4 bits of information. If all 16×16 possible combinations were allowed they could represent 8 bits of information. However, each codeword is designed to have 4 information bits and 4 redundant bits.

Figure 1:
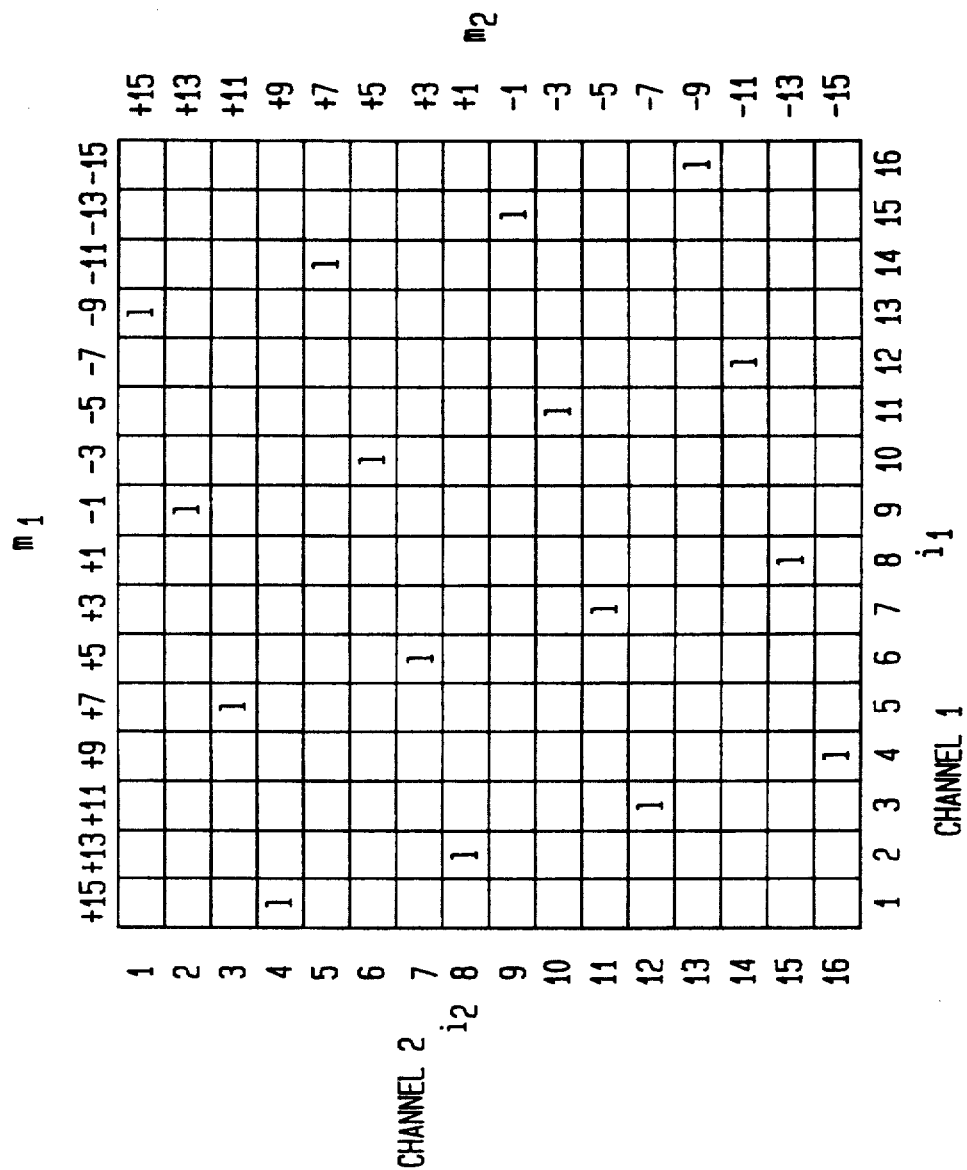
FIG. 1 depicts a signal constellation in the form of a permutation matrix for a coordinated code having 16 levels.

An elucidating manner of describing the coordinated code is with reference to the permutation matrix, P, of FIG. 1. The numbers on the top of the matrix in FIG. 1 that label the columns are the voltages, $m_1$, transmitted on the first channel (channel 1). The numbers on the right of the matrix that label the rows are the voltages, $m_2$, then transmitted on the second channel (channel 2). A 1 in the P matrix denotes a possible codeword [$m_1,m_2$]. The label of the column of the 1 is transmitted on channel 1, and the label of the row of the 1 is transmitted on channel 2. Each column and row of the permutation matrix contain exactly one 1. Only pairs of voltages that share a 1 in their row and column may be transmitted. For example, if +13 volts are transmitted on channel 1, then +1 volt is transmitted on channel 2.

The columns, $i_1$, and rows, $i_2$, of the permutation matrix are indexed by $$i_1 = (15-m_1)/2+1, \; i_2=(15-m_2)/2+1$$

$$\text{for } i_1,i_2 = 1,2,\ldots,16; \; m_1,m_2 = +15, +13, \ldots, -15.$$

The indices of the message, $i_1$, $i_2$, are counting numbers and are convenient for enumerating the code and describing its minimum distance. The squared difference between messages is 4 times the squared difference between their indices. Let $e_1$ be a length 16 vector with a 1 in the $i_1$ position and zeros elsewhere. Then $e_2 P = e_1$, where $e_2$ has a 1 in the $i_2$ position and zeros elsewhere. If voltage $m_1$ is sent on channel 1, then voltage $m_2$ is sent on channel 2, where $[P]_{i_2,i_1}=1$.

The 1's in the permutation matrix are points in a signaling constellation over a two dimensional space. The signaling constellation defined by the P matrix is a special constellation which is obtained by rotating a square constellation. This can be visualized from FIG. 1 since the rotation of the square constellation makes the projection of the special constellation on either axis be equally spaced, which maximizes the minimum distance of the projection and allows for effective diversity.

A different coordinated code can be obtained by rotating a standard constellation by any angle. This will leave the distance between points intact, but will increase the distance between the projections of the points onto any axis (channel). The amount of rotation can be tailored to achieve the desired distances of each projection.

Figure 2:
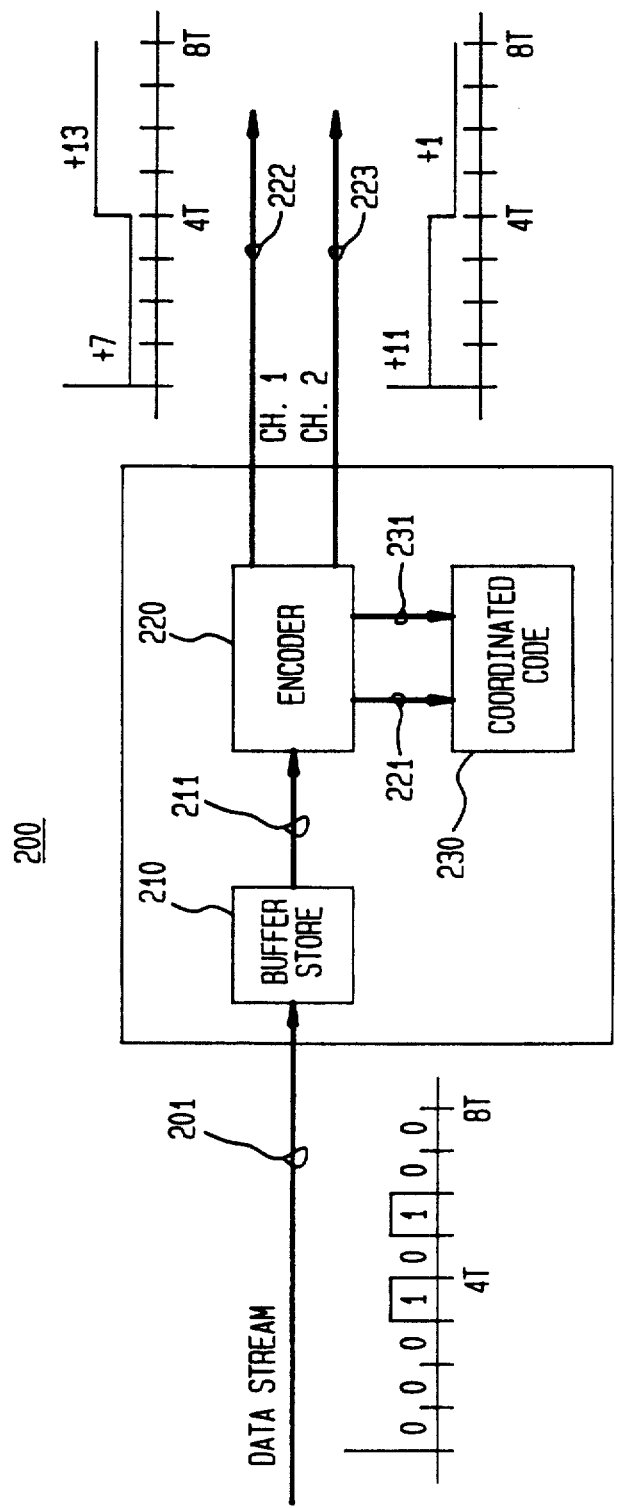
FIG. 2 depicts a block diagram of a transmitter for a two-line coordinated code.

As an illustrative embodiment of a transmitter in accordance with the present invention, reference is made to FIG. 2. Transmitter 200 in FIG. 2 is composed of buffer store 210, encoder 220 responsive to buffer store 210, and coordinated code reference device 230 coupled to encoder 220. The input data stream arrives on lead 201 and is delivered to buffer store 210. An exemplary data stream is shown associated with lead 201, and it includes the bit string 00010100 in the first eight bit positions. Buffer store 210 partitions the bit stream into groups of four bits to form data segments; thus, the first segment is 0001, the next is 0100, and so forth. Using the coordinated code constellation of FIG. 1, one exemplary assignment between each data segment and the voltage levels emitted as determined by the coordinated code is as follows:

| | |
|---|---|
| 0000 | +15,+9 |
| 0001 | +7,+11 |
| 0010 | −1,+13 |
| 0011 | −9,+15 |

-continued

| | |
|---|---|
| 0100 | +13,+1 |
| . | . |
| . | . |
| 1110 | −7,−11 |
| 1111 | −15,−9 |

These mapping relationships may be stored in coordinated code device 230 for reference purposes. Encoder 220 receives each segment from buffer store 210 over lead 211, and with reference to device 230, produces the appropriate voltage levels for propagation on channels 222 and 223 (CH. 1 and CH. 2). Encoder 220 delivers the contents of the data segment to coordinated code device 230 via lead 221, and device 231 responds with the mapping of data segment to voltage levels. For instance, since the data segment in the interval from [0,4T] is 0001, then a voltage level emitted on channel 222 is +7 volts over the interval [0,4T], and the corresponding voltage level on channel 223 is +11 volts during this same interval; for the interval [4T,8T], the data segment is 0100, so the appropriate voltage levels are +13,+1 on channels 222 and 223, respectively. These levels are also depicted in FIG. 2.

An exemplary line code to compare with the coordinated line code so as to demonstrate the principles of the present invention is the 2B1Q line code. With the 2B1Q line code, independent (i.e. uncoordinated), uncoded four level signals are sent on each of the two lines for a total of four message bits on both channels. 2B1Q transmission has no diversity because the bit stream is simply divided between the two channels. Performance of the coordinated code is now measured relative to the uncoordinated 2B1Q line code.

It is now assumed that the noise power on both channels is equal and the noise is uncorrelated. For high signal-to-noise ratio (SNR) with Gaussian noise, the error rate is determined by the minimum Euclidean distance, $d_{min}$, between points in the P matrix. The 1's in the P matrix are positioned to attain maximal minimum distance. This maximal minimum distance is $$d_{max(min)} = \sqrt{2^2 + 8^2} = 2\sqrt{17}$$

that is, the Euclidean distance between, for example, [+15,+9] and [+13,+1]. For comparison purposes, the minimum Euclidean distance of uncoordinated 4 level 2B1Q is 2.

The average power of the coordinated coding scheme is given by the expression $P_{avg} = [(\text{number of signal levels})^2 - 1]/3$; for the exemplary system, there are 16 signal levels, so $P_{avg} = 85$. For comparison purposes, the average power of uncoordinated 2B1Q is 5. Thus, the coordinated coding scheme has $85/5 = 17$ times as much power as 2B1Q. To compare the two schemes on an equal basis, if the voltage of the coordinated coding scheme is divided by $\sqrt{17}$, then the resultant average power is the same as for 2B1Q. The minimum Euclidean distance of the coded messages scheme divided by $\sqrt{17}$ is 2, the same minimum Euclidean distance as uncoordinated 2B1Q messages. Thus the code performs at least as well as uncoordinated transmission when the two channels have independent and equal power noise.

Figure 3:
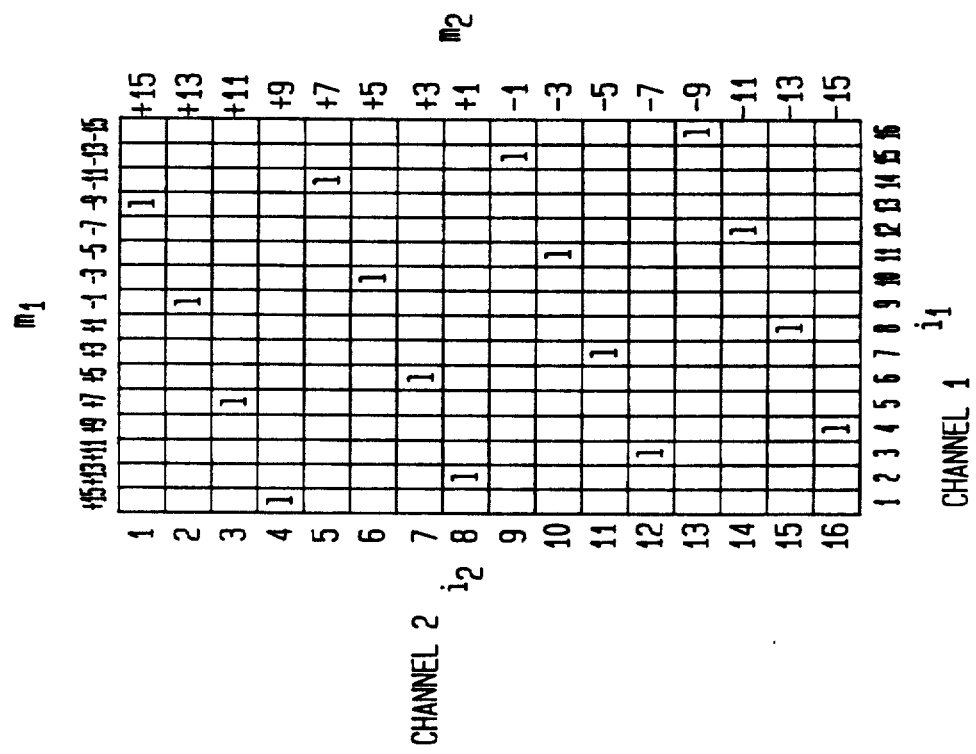
FIG. 3 is a dilated signal constellation showing the effects of noise on the coordinated codeword lattice.

When the noise powers are unequal the behavior becomes more complicated. Since the bit error rate is determined by the SNR, increasing the noise power on a given channel has the same effect as decreasing the signal power on that channel. Decreasing the signal power on a given channel makes the signal points closer together on the dimension of the constellation corresponding to that channel. Thus, a change in noise power effectively dilates the signal constellation, as exemplified by FIG. 3, where the noise power on channel 1 is twice the noise power on channel 2. So, for unequal noise powers (the ratio of the noise power in the first channel to the noise power in the second channel is given by Δ) the shape of the constellation is a rectangle instead of a square. As Δ diverges from 1, the rectangle becomes flatter or thinner. But no matter how flat or thin it becomes, the signal points of the coordinated code will never overlap. Thus if the noise on one channel becomes arbitrarily large then all 4 information bits can still be fully recovered, provided that the noise on the other channel stays below a certain value. In contrast, an uncoordinated transceiver has a square constellation on an unrotated square lattice. As Δ diverges from 1, the points in the uncoordinated constellation become closer together and eventually overlap when Δ approaches infinity or zero. The overlapping signals on the noisy channel would be received in error.

II. Channel Characteristics

The transmitter propagates codewords as appropriately modulated to match the transmission medium comprising the two lines. During transmission, the signal on each line is attenuated and distorted by dispersion resulting in intersymbol interference (ISI). The lines are assumed to have the same attenuation. The signal is also corrupted by additive NEXT. The receiver, discussed in more detail below, first samples the signals at discrete time intervals. The receiver then amplifies the signals, removes ISI, and estimates the transmitted message. The ISI may be removed with, for example, a linear equalizer or a Decision Feedback Equalizer (DFE). The receiver arrangement in accordance with the present invention generates symbol-by-symbol decisions and operates independently of time and ISI.

As alluded to above, during transmission the $\underline{m}$ codewords are corrupted by additive NEXT, $\underline{n}$, and the received signal is $$\underline{r} = \underline{m} + \underline{n}$$

where the vectors $\underline{r}$, $\underline{m}$, and $\underline{n}$ are of length 2. NEXT is presumed to be Gaussian noise. The noise power on pair 1 is $E[n_1^2] = \sigma_1^2$, and the noise power on pair 2 is $E[n_2^2] = \sigma_2^2$. The correlation coefficient $k$ is $$k = \frac{E[n_1 n_2]}{\sigma_1 \sigma_2}.$$

The NEXT, $\underline{n}$, has covariance matrix $$K = E[\underline{n}^T \underline{n}] = \begin{bmatrix} \sigma_1^2 & k\sigma_1\sigma_2 \\ k\sigma_1\sigma_2 & \sigma_2^2 \end{bmatrix} \quad (1)$$

and is zero mean Gaussian so that $\Pr(n_1 \leq N_1, n_2 \leq N_2)$ $$= \frac{1}{2\pi\sigma_1\sigma_2 \sqrt{1-k^2}} \int_{-\infty}^{N_1} \int_{-\infty}^{N_2} e^{-\frac{1}{1-k^2}\left(\frac{n_1^2}{\sigma_1^2} - 2k\frac{n_1 n_2}{\sigma_1 \sigma_2} + \frac{n_2^2}{\sigma_2^2}\right)} dn_1 dn_2 \quad (2)$$

The ratio of the noise power on pair 1 to the noise power on pair 2 is defined as $$\Delta = \frac{\sigma_1^2}{\sigma_2^2}. \quad (3)$$

III. The Receiver for the Two Line Case

The receiver estimates channel statistics, $\sigma_1$, $\sigma_2$ and k, and performs maximum likelihood estimation on the received vector $r$. The maximum likelihood receiver's estimate, $\hat{m}$, is defined by $$f(\underline{r}|\hat{\underline{m}}) = \max_{\underline{m}} f(\underline{r}|\underline{m}), \quad (4)$$

where $f(\underline{r}|\underline{m})$ is the probability density function of the received vector $\underline{r}$, given that $\underline{m}$ was the transmitted vector.

From equations (1) and (2), if $\underline{m}$ was transmitted, then $\underline{r} = \underline{n} + \underline{m}$ has a Gaussian density with mean $\underline{m}$ and covariance K. The maximization of equation (2) occurs when the negative exponent in the Gaussian density is minimized. Substituting $r_1 - m_1$ for $n_1$ and $r_2 - m_2$ for $n_2$ in the exponent leads to the maximum likelihood estimate, $\hat{m} = [\hat{m}_1, \hat{m}_2]$, which is the code vector achieving the minimum metric over all 16 possible code vectors, that is, $$\text{metric}(\hat{m}_1, \hat{m}_2) = \min_{[m_1, m_2]} \text{metric}(m_1, m_2) \quad (5)$$

where from (2), (4), and (5), $$\text{metric}(m_1,m_2) = \sigma_2^2(r_1-m_1)^2 + \sigma_1^2(r_2-m_2)^2 - 2k\sigma_1\sigma_2(r_1-m_1)(r_2-m_2). \quad (6)$$

The messages $m_1$ and $m_2$ are not differentiable functions of each other. Therefore, the minimization in equation (6) may be carried out exhaustively over all 16 possibilities. If $\sigma_1 = \sigma_2$ and $k = 0$, then the maximum likelihood estimate, $\hat{m}$, is the codeword of nearest Euclidean distance to the received vector, $\underline{r}$.

Figure 4:
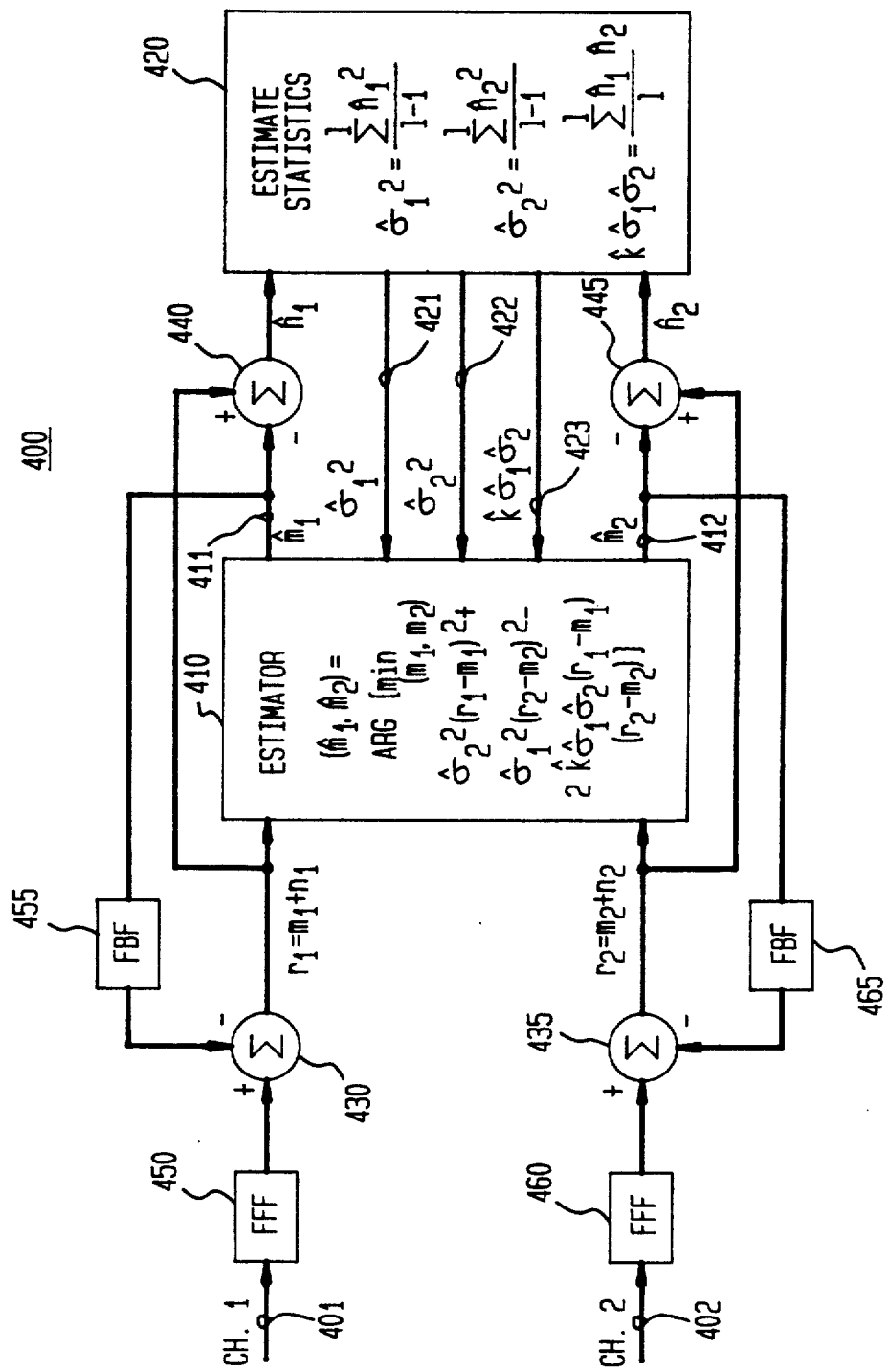
FIG. 4 is an illustrative DFE receiver for the coordinated code for the two channel case.

The coordinated coding technique can be incorporated into adaptive receiver 400, depicted in FIG. 4, which is an improvement to a decision feedback equalizer. The principle of operation of a DFE is wellknown in the art; for instance, reference is made to Chapter 6 of the text entitled *Digital Communications*, by J. G. Proakis, published by McGraw-Hill, 1983. For the sake of the following discussion, it is important to note that a DFE is composed of two parts, namely, a feed forward filter (FFF) section and a feedback filter (FBF) section, such as elements 450 and 455 in channel 1 (CH. 1) of FIG. 4. A FFF section generally compensates for precursor ISI and noise, whereas a FBF section is arranged to compensate for post-cursor ISI (see "Digital Subscriber Line Terminals for Use with Correlated Line Codes," by J. W. Lechleider, in *IEEE Transactions on Communications*, Vol. COM-35, No. 10, October, 1987 which is incorporated herein by reference). Either a FFF section or a FBF section may be realized as a tapped delay line.

With reference to the upper channel, i.e., channel 1 (CH. 1), in FIG. 4 (the lower channel, i.e., channel 2 (CH. 2), may be described in the same manner), it is shown that the input to channel 1 of receiver 400, which appears on lead 401, is coupled to FFF 450 and, in turn, the output of FFF 450 serves as one input to subtractor 430. The other input to subtractor 430 is provided by FBF 455. The output of subtractor 430 is the input to both estimator device 410 and subtractor 440. The estimate to the first message $\hat{m}_1$ appears on lead 411 of estimator device 410. This estimate also serves as the input to FBF 455 and one input to subtractor 440. The output of subtractor 440, which is an estimate to the noise $\hat{n}_1$ on the first channel, serves as one of two inputs to estimate statistics device 420. The noise statistics are generally estimated adaptively in device 420. Since $r_i = n_i + m_i$, $i = 1,2$, then $\hat{n}_i = r_i - \hat{m}_i$ is the noise on pair i if $\hat{m}_i$ is correct. The noise estimates $\hat{n}_i$ can be weighted at each time unit and summed to form estimates of the noise statistics $\hat{\sigma}_1$, $\hat{\sigma}_2$, and $\hat{k}$. Statistics device 420 estimates $\hat{\sigma}_1$, $\hat{\sigma}_2$, and $\hat{k}$ given l samples of $[\hat{n}_1, \hat{n}_2]$, as shown in FIG. 4. These estimates are then delivered to estimator device 410 via leads 421, 422, and 423, respectively, where $[\hat{m}_1, \hat{m}_2]$ are determined. For the 2 channel, four-level coordinated code illustrative receiver 400, all 16 possible metrics in equation (6) can be computed by device 410, in parallel, and their minimum then selected as the decoded estimate.

Figure 5:
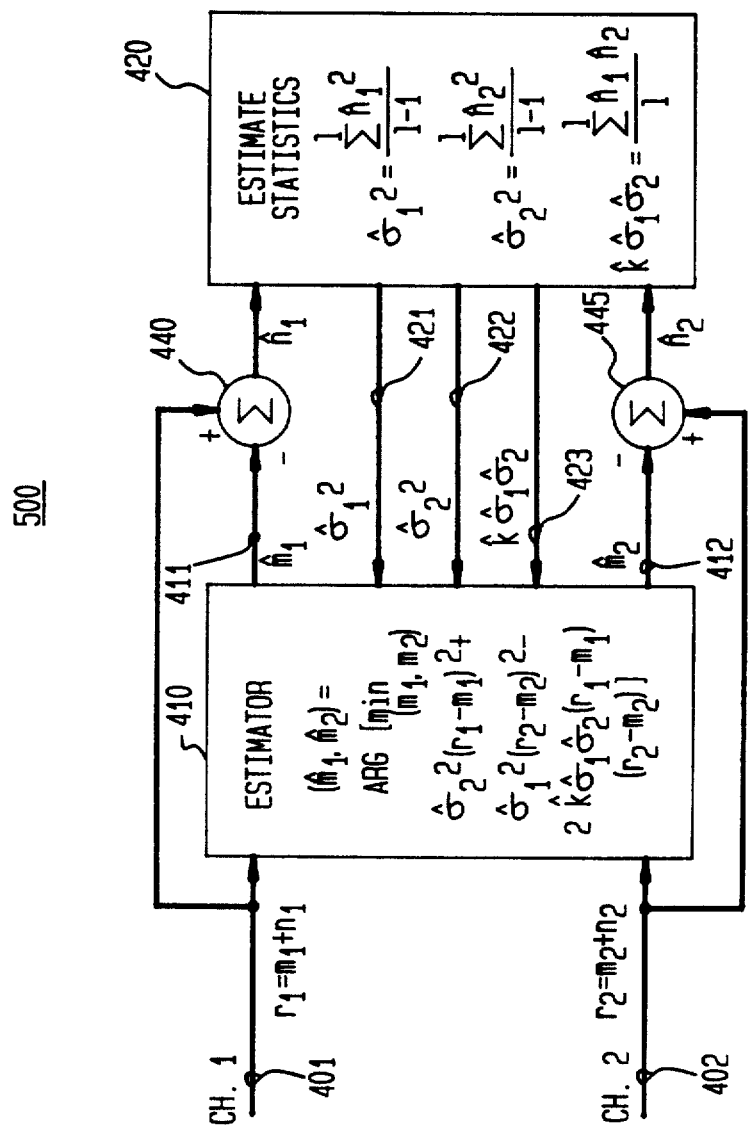
FIG. 5 is an illustrative receiver in those cases wherein a DFE is not required.

In those situations in which a DFE is not required, then receiver 500 shown in FIG. 5 may be utilized. As depicted, receiver 500 is a simplified version of receiver 400, and elements common to both FIGS. 4 and 5 have the same reference numerals. In effect, the FFF and FBF sections of a DFE are not required, so the inputs to subtractor 440 for channel 1 are the input signal appearing on lead 401 as well as the estimate appearing on lead 411. The noise estimates are effected by decision device 420 in the same manner, and estimator device 410 utilizes these noise statistics to determine the estimates to the codewords $m_1$ and $m_2$.

Figure 6:
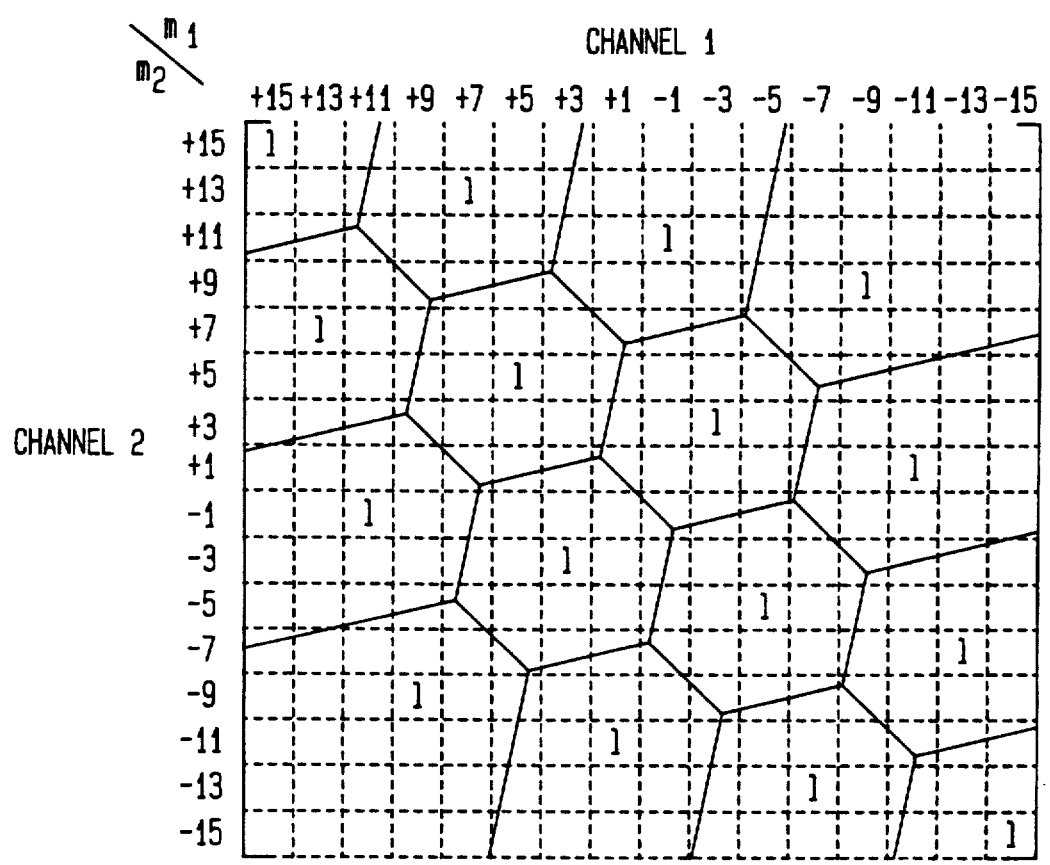
FIG. 6 shows the decision boundaries for the two-channel case with equal noise power on each channel.

For either receiver realization (i.e. receiver 400 or receiver 500), consider the case where $\sigma_1 = \sigma_2$, $\Delta = 1$, and $k = 0$. In this case, the maximum likelihood estimate $\hat{m}$ is the point of nearest Euclidean distance to the received point $r$ in the plane $(m_1, m_2)$. The decision boundaries are shown in FIG. 6.

If the received signal $r$ is quantized before estimation, then the metric computation equation (6) could be replaced by a look-up table. With 16 equally spaced quantization levels (four bits) per pair, the quantization boundaries would be the solid lines shown in FIG. 1. However, to mitigate quantization noise, the number of quantization levels used for table look-up is larger than 16. Typically, the 16 level coordinated coded signals require 2 more quantization bits for echo cancellation than the 4 level uncoordinated signals.

(Notice that if the correlation coefficient $k = 1$ there is a singularity in the density (2), so that equations (5) and (6) are no longer correct. However, if $k = 1$, then the noise could be completely canceled, resulting in an unlimited bit rate with no errors. Thus it is assumed that $k \neq 1$. If k is ignored by the receiver, that is, $k = 0$, then the last term in equation (6) is zero and decoding is simplified. However, it was found setting $k=0$ in equation (6) significantly decreases performance if k is actually large.)

Illustrative Embodiment

I. Transmitter for the Fading or L Line Case

In this section it is shown how to implement a coordinated code for an arbitrary number of channels and an arbitrary number of signaling levels. The coordinated coding scheme may be used for any communication system where there is more than one channel and the channels may carry different signals. Applications include digital radio diversity systems and multi-tone or multi-channel (vector coded) transmission.

Under consideration is the transmission of N-ary pulse amplitude modulated (PAM) signals in the presence of additive Gaussian noise. On each of L separate channels, the receiver equalizes and amplifies the signal, then samples the signals each symbol period. The receiver then uses the L samples to estimate the transmitted message. From another viewpoint, the coordinated code transmits $M^L$-ary coded signals on each channel, where the mapping between the N-ary PAM system and the $M^L$-ary coordinated code system yields $N = M^L$.

Similarly, for quadrature amplitude modulation (QAM), each subchannel (in-phase and quadrature) is coded separately with the same code as PAM. For phase-shift keying (PSK), the points on the unit circle of the phase plane are each coded the same as PAM. Accordingly, for PSK, the signal transmitted on channel v has unit amplitude and an angle given by $$2\pi i_v / (M^L + 1).$$

At each symbol period, the coordinated code transmitter sends a coded message, $\underline{m} = [m_1, m_2, \ldots, m_L]$, where $m_v$ is the transmitted signal on channel v, $$m_v \in \{-M^L + 1, -M^L + 3, \ldots, M^L - 3, M^L - 1\}.$$

If the coded message on channel v is indexed by $i_v$, where $$i_v = (M^L - 1 - m_v)/2 + 1,$$

then $$m_v = 2(1 - i_v) - 1 + M^L.$$

Figure 7:
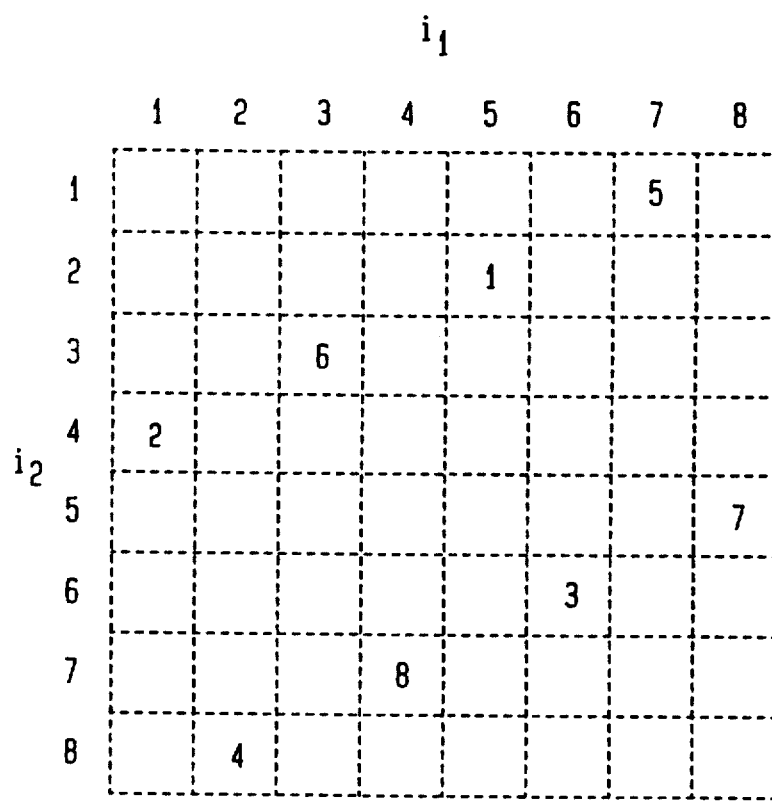
FIG. 7 illustrates a code constellation for a two-level PAM system with three channels.

To demonstrate one possible construction of a coordinated code for this general case, let $i_1$ be the index of the message transmitted on the first channel. Then the indices of all the other messages, $i_v$, $v = 2, 3, \ldots, L$, are uniquely determined by the code mapping $$i_v = \qquad (7)$$

$$[(i_1 - 1)M^{L-v+1}] \bmod M^L + M^{L-v+1} + 1 - \left\lceil \frac{i_1}{M^{v-1}} \right\rceil$$

where $\lceil j \rceil$ is the round up of j. There are $M^L$ possible values of $i_1$ so the code transmits $M^L$ information bits, the same as uncoordinated transmission. The code constellation for $M = 2$ and $L = 3$ is illustrated in FIG. 7.

The code partitions the indices $i_v$ into $M^{v-1}$ subsets, and each subset has $M^{L-v+1}$ indices. Relative to the index on channel 1, $i_1$, the distance between indices within each subset is maximized. Then adjacent elements in different subsets are arranged to have good spacing.

Figure 8:
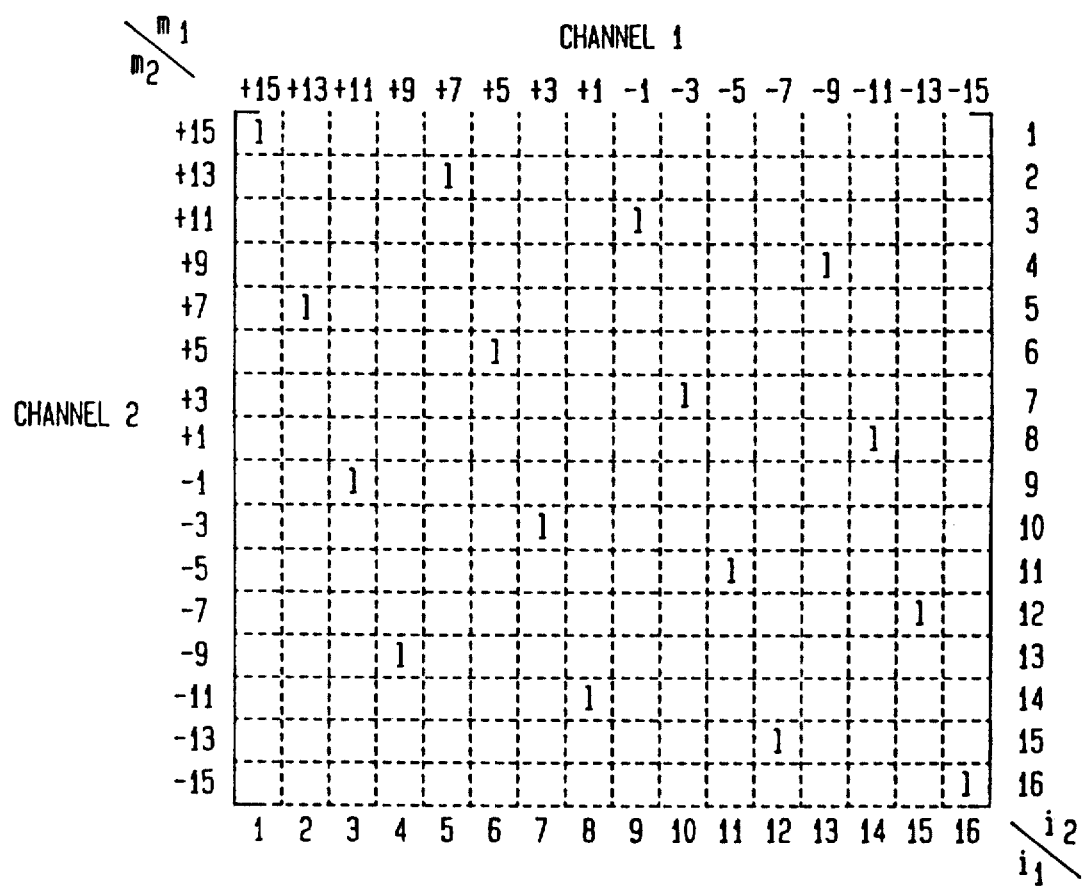
FIG. 8 illustrates a coordinated code having a symmetric permutation matrix.

(It should also be realized that when $M^L$ is large compared to L, the code mapping may be shifted to have a symmetric permutation matrix (constellation), while maintaining its distance properties. This makes the set of transmitted signals $\{m_1, \ldots, m_L\}$ equal the reversed set $\{m_L, \ldots, m_1\}$, which facilitates decoding. The constellation depicted in FIG. 8 is such a symmetric constellation for $L = 2$ and $M = 2$.)

II. Channel Characteristics

During transmission of the message $m_v$ on each channel v, the message is corrupted by additive Gaussian noise $n_v$ with variance $\sigma_v^2$. Also, each symbol $m_v$ is attenuated by independent fading amplitude denoted $a_v$. Thus the received vector is $\underline{r} = \underline{m}A + \underline{n}$, where $\underline{m} = [m_1, m_2, \ldots, m_v]$, $A = \text{diag}[a_1, a_2, \ldots, a_v]$ is the diagonal matrix of attenuations, $\underline{n} = [n_1, n_2, \ldots, n_v]$, and $\underline{r} = [r_1, r_2, \ldots, r_v]$ for $v = 1, 2, \ldots, L$. The noise, $\underline{n}$, has covariance matrix $$K = E[\underline{n}^T \underline{n}]$$

(T denotes Hermitian transpose) and is zero mean Gaussian so that $$Pr(n_1 \leq N_1, \ldots n_L \leq N_L) = \qquad (8)$$

$$(2\pi)^{-n/2} (\det[K])^{-1/2} \int_{-\infty}^{N_1} \int_{-\infty}^{N_L} e^{-(\underline{n}K^{-1}\underline{n}^T)/2} d\underline{n}.$$

The noise power on channel v is $E[n_v^2] = \sigma_v^2$. The ratio of the noise power on channel 1 to the noise power on channel v is defined as $$\Delta_v = \frac{\sigma_1^2}{\sigma_v^2}. \qquad (9)$$

III. Receiver for the Fading or L Line Case

The receiver estimates the message with maximum likelihood estimation (MLE). The MLE, denoted $\hat{\underline{m}}$, maximizes the conditional probability density as set forth above in equation (4), and as repeated here for completeness:

$$f(\underline{r}|\hat{\underline{m}}) = \max_{\underline{m}} f(\underline{r}|\underline{m}), \qquad (4)$$

where $f(\underline{r}|\underline{m})$ is the probability density function of the received vector $\underline{r}$, given that $\underline{m}$ was the transmitted vector. The maximum likelihood receiver estimates the message by minimizing the exponent in the multivariate Gaussian density (equation (8)) of the received signal. Given the received vector, $\underline{r}$, the maximum likelihood receiver outputs the codeword, $\hat{\underline{m}}$, that minimizes the metric given by $$\text{metric}(\underline{m}) = (\underline{r} - \underline{m}A)K^{-1}(\underline{r} - \underline{m}A)^T. \qquad (10)$$

If it is assumed that the noise on different channels is independent, then the metric $\text{metric}(m_1, m_2, \ldots, m_L)$ is $$= \frac{(r_1 - a_1 m_1)^2}{\sigma_1^2} + \frac{(r_2 - a_2 m_2)^2}{\sigma_2^2} + \ldots + \frac{(r_L - a_L m_L)^2}{\sigma_L^2}. \quad (11)$$

Figure 9:
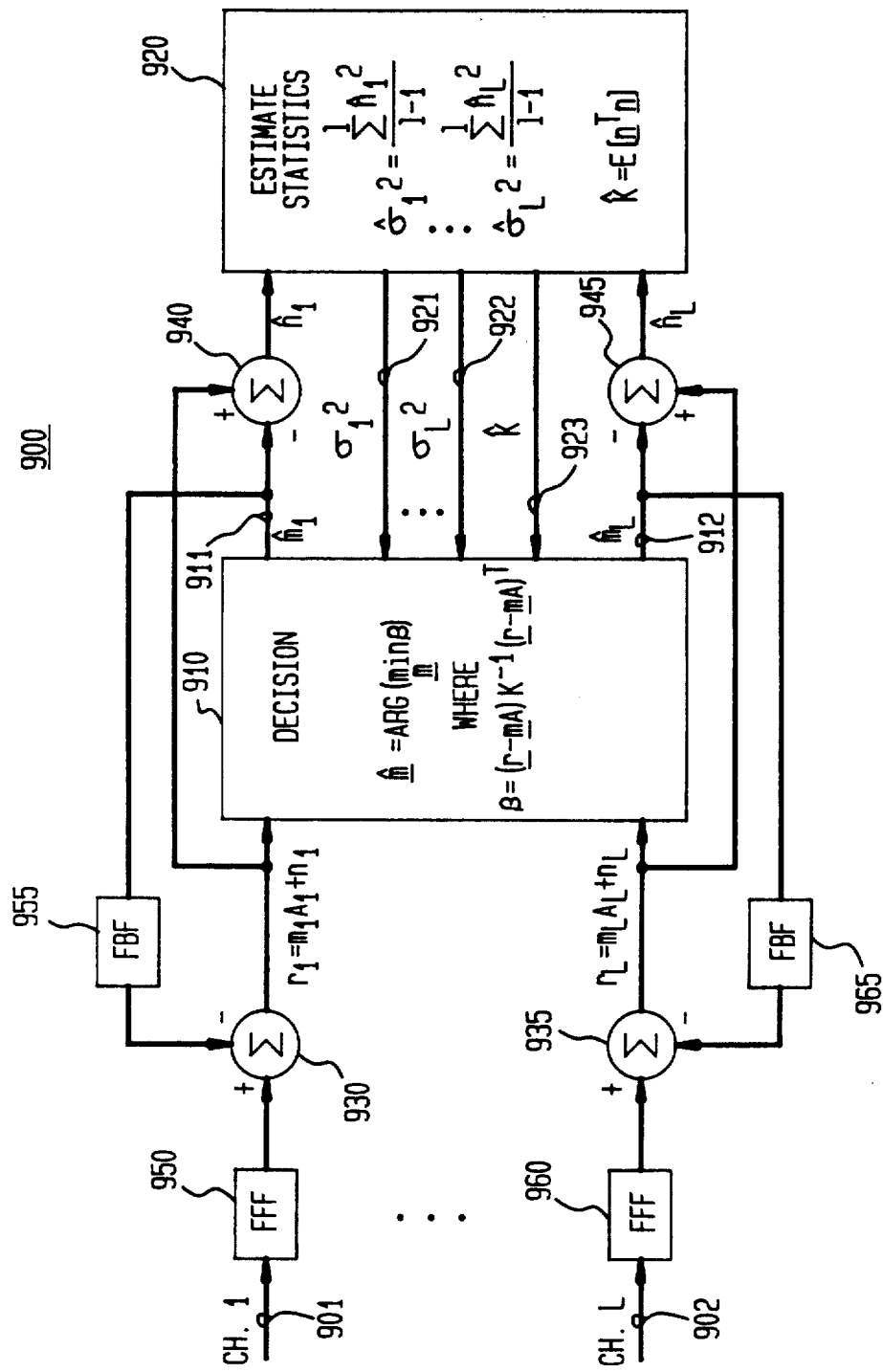
FIG. 9 is an illustrative, general DFE receiver for the L-channel case of the coordinated code.

DFE receiver 900 shown in FIG. 9 is an illustrative embodiment of a coordinated code receiver for the L channel case. Receiver 900 is a generalization to the two-channel receiver 400 of FIG. 4 and may be described in a similar manner. Accordingly, with reference to the uppermost channel, i.e., channel 1 (CH. 1), in FIG. 9 (the other L−1 channels may be described in substantially the same way), it is shown that the input to channel 1 of receiver 900, which appears on lead 901, is coupled to FFF 950 and, in turn, the output of FFF 950 serves as one input to subtractor 930. The other input to subtractor 930 is provided by FBF 955. The output of subtractor 930 is the input to both decision device 910 and subtractor 940. The estimate to the first message $m_1$ appears on lead 911 of decision device 910. This estimate also serves as the input to FBF 955 and one input to subtractor 940. The output of subtractor 940, which is an estimate to the noise $\hat{n}_1$ on the first channel, serves as one of L inputs to estimated statistics device 920. The noise statistics are generally estimated adaptively in device 920. Since $r_i = n_i + m_i$, $i = 1, 2, \ldots, L$ then $\hat{n}_i = r_i - \hat{m}_i$ is the noise on pair $i$ if $\hat{m}_i$ is correct. The noise estimates $\hat{n}_i$ can be weighted at each time unit and summed to form estimates of the noise statistics $\hat{\sigma}_1, \hat{\sigma}_2, \ldots, \hat{\sigma}_L$. Moreover, device 920 computes $\hat{K}$ using any standard statistics technique. Statistics device 920 estimates $\hat{\sigma}_1, \hat{\sigma}_2, \ldots, \hat{\sigma}_L$, and $\hat{k}$ given 1 samples of $[\hat{n}_1, \hat{n}_2, \ldots, \hat{n}_L]$. These estimates are then delivered to decision device 910 via leads 921, 922, and 923, respectively, where $[m_1, m_2, \ldots, m_L]$ are determined.

(Notice that if the correlation coefficient $k = 1$ there is a singularity in the density equation (8), so that equation (9) is no longer correct. An easy solution for this difficulty is to bound $k$ below 1, i.e., $0 \leq K \leq 0.999$ or some other convenient bound.)

It is to be understood that the above-described embodiments are simply illustrative of the principles in accordance with the present invention. Other embodiments may be readily devised by those skilled in the art which may embody the principles in spirit and scope. Thus, it is to be further understood that the circuit arrangements and concomitant methods described herein are not limited to the specific forms shown by way of illustration, but may assume other embodiments limited only by the scope of the appended claims.

What is claimed is:

1. A method for coding an input digital data stream comprising the steps of
   receiving the input data stream and grouping the stream into data segments for coding, and
   encoding each of said data segments with reference to a predetermined multi-point, multi-dimensional coordinated code constellation to produce encoded signals for each of said data segments, wherein said encoded signals for each of said data segments represent coordinates of one of said points in said coordinated code constellation and wherein at most one of said points is located at each coordinate of each of said dimensions and at least one of said coordinates of at least one of said points is different from other of said coordinates.

2. A method for coding an input digital data stream to produce an output signal stream for each of a plurality L of channels, the method comprising the steps of
   receiving the input data stream and grouping the stream into data segments for coding,
   encoding each of said data segments with reference to a predetermined multi-point, multi-dimensional coordinated code constellation to produce L encoded signals for each of said data segments, wherein each of said encoded signals for each of said data segments represents one of L coordinates of one of said points in said coordinated code constellation and wherein at most one of said points is located at each coordinate of each of said dimensions and at least one of said L coordinates of at least one of said points is different from other of said L coordinates, and
   propagating each of said L encoded signals for each of said data segments on a corresponding one of the L channels to thereby produce the output signal stream on each of the L channels.

3. A method for coding an input digital data stream to produce an output signal stream for each of a plurality L of channels, the method comprising the steps of
   receiving the input data stream and grouping the stream into data segments for coding,
   encoding each of said data segments with reference to a predetermined coordinated code constellation to produce L encoded signals for each of said data segments, which encoded signals are permutations of one another, and
   propagating each of said L encoded signals for each of said data segments on a corresponding one of the L channels to thereby produce the output signal stream on each of the L channels, wherein each of the data segments contains $L\log_2 M$ positions defining a symbol period, and said step of propagating includes the step of transmitting, during each said symbol period, a message vector $m = [m_1, m_2, \ldots, m_L]$ over the L channels, said message vector determined with reference to said predetermined coordinated code constellation, where $m_v$ is a transmitted signal on channel v, $$m_v \in \{-M^L + 1, -M^L + 3, \ldots, M^L - 3, M^L - 1\}.$$

4. The method as recited in claim 3 wherein for said transmitted signal $m_v$, there is a corresponding index $i_v$, with $$i_v = (M^L - 1 - m_v)/2 + 1,$$

and for $i_1(i_1 = 1, 2, \ldots, M^L)$ being the index of the message transmitted on the first of the L channels, then the indices of all the other messages, $i_v$, $v = 2, 3, \ldots, L$, are uniquely given by the code index mapping $$i_v =$$

$$[(i_1 - 1)M^{L-v+1}] \text{modulo } M^L + M^{L-v+1} + 1 - \left\lceil \frac{i_1}{M^{v-1}} \right\rceil$$

where $\lceil j \rceil$ is the round up of j.

5. Circuitry for coding an input digital data stream comprising
   means for receiving the input data stream and for grouping the stream into data segments for coding, and means for encoding each of said data segments with reference to a predetermined multi-point, multi-dimensional coordinated code constellation to produce encoded signals for each of said data segments, wherein said encoded signals for each of said data segments represent coordinates of one of said points in said coordinated code constellation and wherein at most one of said points is located at each coordinate of each of said dimensions and at least one of said coordinates of at least one of said points is different from other of said coordinates.

6. Circuitry for coding an input digital data stream to produce an output signal stream for each of a plurality L of channels, the circuitry comprising means for receiving the input data stream and for grouping the stream into data segments for coding, means for encoding each of said data segments with reference to a predetermined multi-point, multi-dimensional coordinated code constellation to produce L encoded signals for each of said data segments, wherein each of said L encoded signals for each of said data segments represents one of L coordinates of one of said points in said coordinated code constellation and wherein at most one of said points is located at each coordinate of each of said dimensions and at least one of said L coordinates of at least one of said points is different from other of said L coordinates, and means for propagating each of said L encoded signals for each of said data segments on a corresponding one of the L channels to thereby produce the output signal stream on each of the L channels.

7. Circuitry for coding an input digital data stream to produce an output signal stream for each of a plurality L of channels, the circuitry comprising means for receiving the input data stream and for grouping the stream into data segments for coding, means for encoding each of said data segments with reference to a predetermined coordinated code constellation to produce L encoded signals for each of said data segments, which encoded signals are permutations of one another, and means for propagating each of said L encoded signals for each of said data segments on a corresponding one of the L channels to thereby produce the output signal stream on each of the L channels, wherein each of the data segments contains $L\log_2 M$ positions defining a symbol period, and said means for propagating includes means for transmitting, during each said symbol period, a message vector $m = [m_1, m_2, \ldots, m_L]$ over the L channels, said message vector determined with reference to said predetermined coordinated code constellation, where $m_v$ is a transmitted signal on channel v, $$m_v \in \{-M^L+1, -M^L+3, \ldots, M^L-3, M^L-1\}.$$

8. The circuitry as recited in claim 7 wherein for said transmitted signal $m_v$, there is a corresponding index $i_v$, with $$i_v = (M^L - 1 - m_v)/2 + 1,$$

and for $i_1$ ($i_1 = 1, 2, \ldots, M^L$) being the index of the message transmitted on the first of the L channels, then the indices of all the other messages, $i_v$, $v = 2, 3, \ldots, L$, are uniquely given by the code index mapping $$i_v = [(i_1 - 1)M^{L-v+1}] \text{modulo } M^L + M^{L-v+1} + 1 - \left\lceil \frac{i_1}{M^{v-1}} \right\rceil$$

where $\lceil j \rceil$ is the round up of j.

9. A method for decoding received signals transmitted over a plurality L of channels to produce an outgoing data stream, the received signals resulting from grouping an incoming data stream into data segments defining a sequence of symbol periods, encoding each of the segments with reference to a predetermined multi-point, multi-dimensional coordinated code constellation to produce L encoded signals for each of the data segments, and propagating each of the L encoded signals for each of the data segments on a corresponding one of the L channels, the decoding method comprising the steps of measuring the received signals to produce measured signals over each of the symbol periods, estimating the encoded signals from the measured signals utilizing a metric determined with reference to the coordinated code constellation to produce estimated signals for each of the symbol periods, wherein each of said L encoded signals for each of said data segments represents one of L coordinates of one of said points in said coordinated code constellation and wherein at most one of said points is located at each coordinate of each of said dimensions and at least one of said L coordinates of at least one of said points is different from other of said L coordinates, and generating the corresponding one of the data segments from said estimated signals in each of the symbol periods with reference to the coordinated code constellation.

10. A method for decoding received signals transmitted over a plurality L of channels to produce an outgoing data stream, the received signals resulting from grouping an incoming data stream into data segments defining a sequence of symbol periods, encoding each of the segments with reference to a predetermined coordinated code constellation to produce L encoded signals for each of the data segments, and propagating each of the L encoded signals for each of the data segments on a corresponding one of the L channels, the decoding method comprising the steps of measuring the received signals to produce measured signals over each of the symbol periods, estimating the encoded signals from the measured signals utilizing a metric determined with reference to the coordinated code constellation to produce estimated signals for each of the symbol periods, the step of estimating including the steps of subtracting said estimated signals from said measured signals to determine interference estimates over each of the symbol periods, and computing said metric with reference to said interference estimates, and generating the corresponding one of the data segments from said estimated signals in each of the symbol periods with reference to the coordinated code constellation.

11. The method as recited in claim 10 wherein said step of estimating includes the step of determining approximations to interference variances on each of the L channels and an interference covariance across the L channels.

12. The method as recited in claim 11 wherein said metric is of the form $$\text{metric } (\underline{m}) = (\underline{r} - \underline{m}A)K^{-1}(\underline{r} - \underline{m}A)^T,$$

where $\underline{r}$ is the set of said measured signals, $\underline{m}$ is the set of said estimated signals, K is a covariance matrix of said interference estimates, A is a diagonal matrix of channel attenuations on the set of L channels, and said set of estimated signals is selected to minimize said metric.

13. The method as recited in claim 12 wherein said step of determining includes the step of generating a plurality of samples of said interference estimates during each of the symbol periods to determine said variances and said covariance.

14. The method as recited in claim 10 wherein said step of measuring includes the step of equalizing the received signals with a decision feedback equalizer.

15. Circuitry for decoding received signals transmitted over a plurality L of channels to produce an outgoing data stream, the received signals resulting from grouping an incoming data stream into data segments defining a sequence of symbol periods, encoding each of the segments with reference to a predetermined multi-point, multi-dimensional coordinated code constellation to produce L encoded signals for each of the data segments, and propagating each of the L encoded signals for each of the data segments on a corresponding one of the L channels, the decoding circuitry comprising means for measuring the received signals to produce measured signals over each of the symbol periods, means for estimating the encoded signals from the measured signals utilizing a metric determined with reference to the coordinated code constellation to produce estimated signals for each of the symbol periods, wherein each of said L encoded signals for each of said data segments represents one of L coordinates of one of said points in said coordinated code constellation and wherein at most one of said points is located at each coordinate of each of said dimensions and at least one of said L coordinates of at least one of said points is different from other of said L coordinates, and means for generating the corresponding one of the data segments from said estimated signals in each of the symbol periods with reference to the coordinated code constellation.

16. Circuitry for decoding received signals transmitted over a plurality L of channels to produce an outgoing data stream, the received signals resulting from grouping an incoming data stream into data segments defining a sequence of symbol periods, encoding each of the segments with reference to a predetermined coordinated code constellation to produce L encoded signals for each of the data segments, and propagating each of the L encoded signals for each of the data segments on a corresponding one of the L channels, the decoding circuitry comprising means for measuring the received signals to produce measured signals over each of the symbol periods, means for estimating the encoded signals from the measured signals utilizing a metric determined with reference to the coordinated code constellation to produce estimated signals for each if the symbol periods, said means for estimating including means for subtracting said estimated signals from said measured signals to determine interference estimates over each of the symbol periods, and means for computing said metric with reference to said interference estimates, and means for generating the corresponding one of the data segments from said estimated signals in each of the symbol periods with reference to the coordinated code constellation.

17. The circuitry as recited in claim 16 wherein said means for estimating includes means for determining approximations to interference variances on each of the L channels and an interference covariance across the L channels.

18. The circuitry as recited in claim 17 wherein said metric is of the form $$\text{metric } (\underline{m}) = (\underline{r} - \underline{m}A)K^{-1}(\underline{r} - \underline{m}A)^T,$$

where $\underline{r}$ is the set of said measured signals, $\underline{m}$ is the set of said estimated signals, K is a covariance matrix of said interference estimates, A is a diagonal matrix of channel attenuations on the set of L channels, and said set of estimated signals is selected to minimize said metric.

19. The circuitry as recited in claim 18 wherein said means for determining includes means for generating a plurality of samples of said interference estimates during each of the symbol periods to determine said variances and said covariance.

20. The circuitry as recited in claim 16 wherein said means for measuring includes decision feedback equalizer means.

21. A method for coding an input digital data stream comprising the steps of receiving the input data stream and grouping the stream into data segments for coding, and encoding each of said data segments with reference to a predetermined multi-point, two-dimensional coordinated code constellation to produce two encoded signals for each said data segments, said coordinated code constellation being determined by selecting any arbitrary point in a corresponding conventional two-dimensional symmetric code constellation having points, positioning said arbitrary point in a non-occupied coordinate of each dimension in the symmetric constellation, and shifting all other points to maintain the same two-dimensional distance among all points as in the symmetric constellation, said points also being positioned to maintain symmetry with respect to a rotation angle in the two-dimensional symmetric code constellation determined by the shifted coordinate of said arbitrary point, wherein at most one of said points of said coordinated code constellation is positioned at each coordinate of each dimension.

* * * * *